United States Patent
Hinds et al.

(10) Patent No.: US 11,249,657 B2
(45) Date of Patent: Feb. 15, 2022

(54) NON-VOLATILE STORAGE CIRCUITRY ACCESSIBLE AS PRIMARY STORAGE FOR PROCESSING CIRCUITRY

(71) Applicant: Arm Limited, Cambridge (GB)

(72) Inventors: Christopher Neal Hinds, Austin, TX (US); Jesse Garrett Beu, Austin, TX (US); Alejandro Rico Carro, Austin, TX (US); Jose Alberto Joao, Austin, TX (US)

(73) Assignee: Arm Limited, Cambridge (GB)

(*) Notice: Subject to any disclaimer, the term of this patent is extended or adjusted under 35 U.S.C. 154(b) by 230 days.

(21) Appl. No.: 16/507,348

(22) Filed: Jul. 10, 2019

(65) Prior Publication Data

US 2021/0011638 A1    Jan. 14, 2021

(51) Int. Cl.
  *G06F 3/06*    (2006.01)
  *G06F 9/30*    (2018.01)

(52) U.S. Cl.
  CPC .......... *G06F 3/0625* (2013.01); *G06F 3/0659* (2013.01); *G06F 3/0679* (2013.01); *G06F 9/3001* (2013.01); *G06F 9/30036* (2013.01); *G06F 9/30098* (2013.01)

(58) Field of Classification Search
  USPC ....................................................... 711/103
  See application file for complete search history.

(56) References Cited

U.S. PATENT DOCUMENTS

| 5,928,365 A | 7/1999 | Yoshida |
| 2016/0132430 A1* | 5/2016 | Nomura .............. G06F 12/0897 711/119 |
| 2016/0139639 A1 | 5/2016 | Dash et al. |
| 2016/0259398 A1* | 9/2016 | Newham .................. G06F 1/32 |

FOREIGN PATENT DOCUMENTS

EP    2966540    1/2016

OTHER PUBLICATIONS

International Search Report and Written Opinion of the International Searching Authority for PCT/GB2020/051094 dated Jul. 23, 2020, 16 pages.

* cited by examiner

*Primary Examiner* — Than Nguyen
(74) *Attorney, Agent, or Firm* — Nixon & Vanderhye P.C.

(57) ABSTRACT

Non-volatile storage circuitry is provided as primary storage accessible to processing circuitry, e.g. as registers, a cache, scratchpad memory, TLB or on-chip RAM. Power control circuitry powers down a given region of the non-volatile storage circuitry when information stored in said given region is not being used. This provides opportunities for more frequent power savings than would be possible if primary storage was implemented using volatile storage.

17 Claims, 7 Drawing Sheets

EXEMPLARY SYSTEM

NON-VOLATILE STORAGE CIRCUITRY ACCESSIBLE AS PRIMARY STORAGE FOR PROCESSING CIRCUITRY

BACKGROUND

Technical Field

The present technique relates to the field of data processing.

Technical Background

A data processing apparatus may have processing circuitry which performs data processing in response to instructions. The processing circuitry may reference primary storage circuitry when performing its data processing.

SUMMARY

At least some examples provide an apparatus comprising:
processing circuitry to perform data processing in response to instructions;
non-volatile storage circuitry accessible by the processing circuitry as primary storage; and
power control circuitry to power down a given region of the non-volatile storage circuitry when information stored in said given region is not being used.

At least some examples provide an apparatus comprising:
means for performing data processing in response to instructions;
means for non-volatile storage accessible by the means for performing data processing as primary storage; and
means for powering down a given region of the means for non-volatile storage when information stored in said given region is not being used.

At least some examples provide a data processing method comprising:
performing data processing in response to instructions, using processing circuitry;
accessing non-volatile storage circuitry as primary storage of the processing circuitry; and
powering down a given region of the non-volatile storage circuitry when information stored in said given region is not being used.

Further aspects, features and advantages of the present technique will be apparent from the following description of examples, which is to be read in conjunction with the accompanying drawings.

DESCRIPTION OF EXAMPLES

Figure 1:
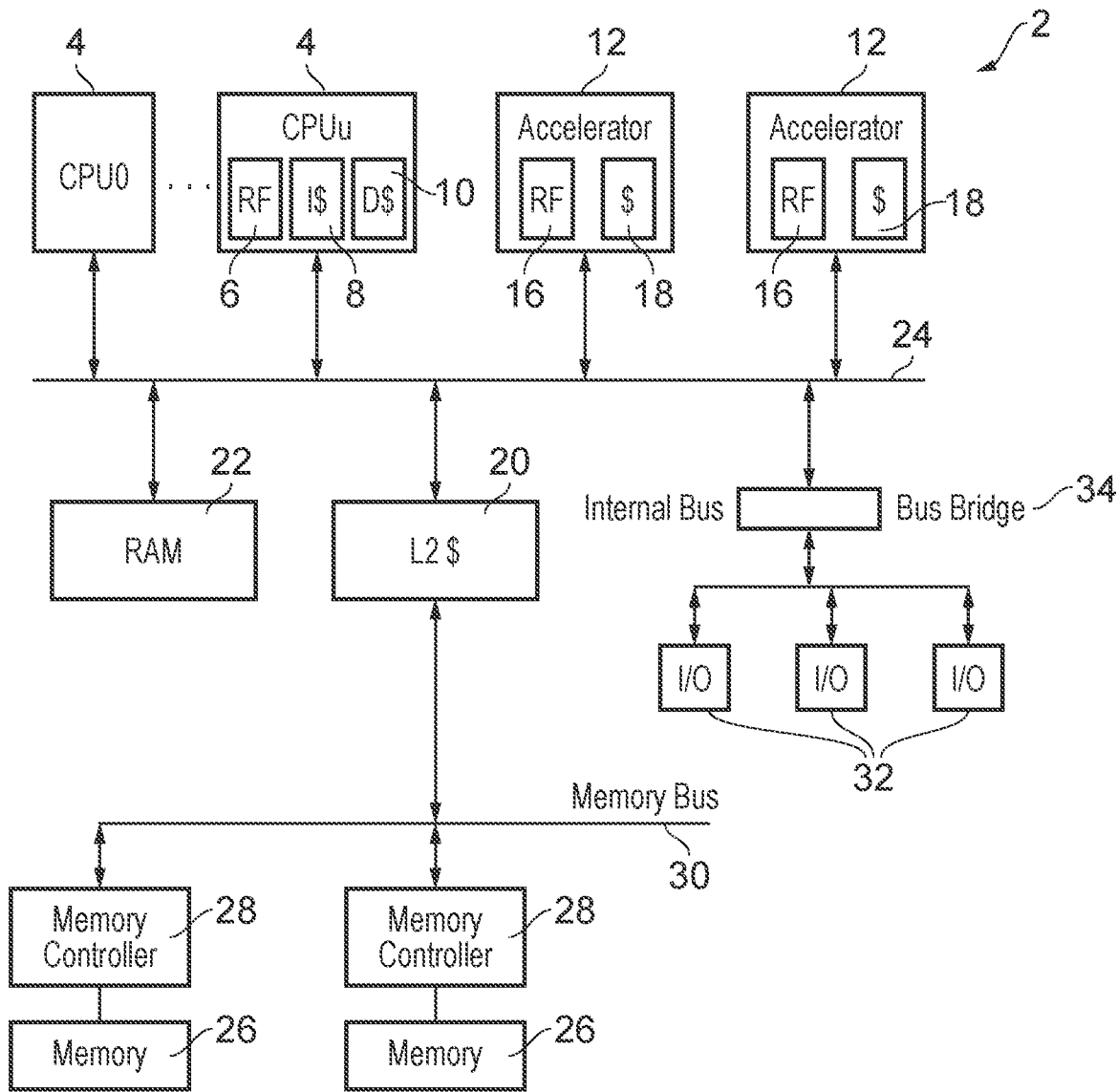
FIG. 1 shows an example of a data processing system.

A computing system may have processing circuitry to perform data processing in response to instructions. The system may have storage circuitry for storing data. Computing storage may typically be considered to include primary storage and secondary storage. Primary storage stores the program code and working data of the software being processed by the processing circuitry. For example, the primary storage may include registers for storing architectural state of the processing circuitry, cache memory, on-chip random access memory (RAM), as well as other storage structures directly accessible by the processing circuitry such as translation lookaside buffers (TLBs). In contrast, secondary storage provides mass storage capacity for storing data and program code which does not relate to programs currently being processed and has not specifically been requested for access by the processing circuitry, but which is retained for potential use in future. Typically the secondary storage is not directly accessible by the processing circuitry but can be accessed using input/output channels. Hence, when the processing circuitry needs to execute a given piece of software then the program code and working data of that software may be copied from secondary storage into primary storage before the processing circuitry can start executing the software. During execution of the software the processing circuitry may generate further data which may be stored within the primary storage temporarily while the software is executed. When finishing program execution for a given piece of software, if any of the data generated by that software needs to be retained then it would need to be written to the secondary storage as otherwise it may be overwritten in the primary storage when other software is executed on the processing circuitry.

Storage circuitry may be either volatile or non-volatile. Volatile storage circuitry may be implemented using technology such as DRAM (Dynamic Random Access Memory) or SRAM (Static Random Access Memory). Volatile storage circuitry will eventually lose its stored information if no power is supplied to the memory cell. In contrast, non-volatile storage circuitry can retain its information even when power is switched off to the memory cell. Examples of non-volatile memory storage include Flash memory, ferroelectric random access memory (FeRAM), magneto resistive random access memory (MRAM), etc.

Access to volatile storage circuitry is typically much faster than access to non-volatile storage circuitry. For the primary storage of the processing circuitry, which will need to be accessible frequently on an instruction-by-instruction basis, volatile storage technology such as SRAM is typically used. Non-volatile storage has typically been regarded as unsuitable for use as primary storage, because its access speeds would be considered too slow for use as primary storage.

However, the inventors recognised that non-volatile storage technologies are becoming available which can start to offer a level of access speed and longevity which may be suitable for some fields of application even when used as primary storage. For example, non-volatile memory technologies such as Correlated Electron Random Access Memory (CeRAM) may offer higher access speed than with previous non-volatile memory technologies. Also, even with other slower forms of non-volatile memory technology, it is recognised that with the increasing expansion of the Internet of Things, there is an increasing demand for low processing capability devices which do not need a high level performance, but require greater energy efficiency, as they may be powered by battery or based on harvesting of ambient energy, and so have an extremely constrained energy budget. For such fields of application, performance is not the main criterion, and so the use of non-volatile memory storage as primary storage may be attractive from a power saving point of view even at the expense of lower performance. Hence, it is proposed to use non-volatile memory as primary storage for the processing circuitry, rather than merely as secondary storage.

By using non-volatile storage circuitry as primary storage of the processing circuitry, this provides opportunity for much greater power savings than would be possible if the primary storage was implemented using volatile storage circuitry. Hence, power control circuitry is provided to power down a given region of the non-volatile (primary) storage circuitry when information stored in that given region is not being used.

In typical data processing systems, all of the program code and working sets of data associated with the threads for which processing has started but not yet terminated would need to be retained in volatile storage circuitry such as SRAM, which can burn a significant amount of power in continuing to power the SRAM cells storing the code/data even at times when a particular thread is not actively issuing an instruction or reading/writing its data. In typical systems, once a thread has been initialised by writing its working data and instructions into primary storage, then the data and instructions associated with that thread will continue to be stored in volatile primary storage until the thread is deactivated.

In contrast, when non-volatile storage circuitry is used as primary storage, this means that when a thread has been initialised and not yet terminated, and is generally being processed, in relatively short windows of time when that thread is not actively issuing instructions or reading/writing its data, the region of the non-volatile storage circuitry storing the code/data for that thread may be powered down. The use of non-volatile storage for the primary storage makes it practical to power up and down regions of primary storage on a much more frequent basis than if volatile storage circuitry was used. This is because the non-volatile storage circuitry continues to retain its state even when not powered, and so when powering down a given region of non-volatile primary storage circuitry there is no need to save the data to a powered up region or to secondary storage to preserve it for when it may be needed later. Typically, state saving and restoration operations (for copying data to another location and restoring it later when needed again) can incur a large amount of latency and power, which limits how frequently conventional volatile storage can be powered down. In contrast, by using non-volatile storage as the primary storage, this avoids the state saving/restoration latency, so it is practical to power off regions of storage much more frequently. This can greatly reduce the overall power consumption of the processing circuitry and the primary storage.

When powering down the given region of the non-volatile storage circuitry used as primary storage, the power control circuitry may omit saving of information stored in the given region to a powered up storage region of volatile or non-volatile storage circuitry or to secondary storage. This would not be possible for primary storage implemented using volatile memory technologies.

The power control circuitry may power down a given region of the non-volatile storage circuitry while the processing circuitry continues to perform active data processing in response to instructions. Hence, while processing continues on the processing circuitry, nevertheless regions of primary storage storing information not used for a given cycle can be powered down.

The information stored in the powered down given region of the non-volatile storage circuitry may comprise working data or instructions relating to active threads which have not yet been terminated. The working data and the instructions of an active non-terminated thread would normally need to be retained in volatile storage circuitry until the thread is terminated, which would require the storage cells storing that information to be powered up. By instead using non-volatile storage circuitry as the primary storage of the processing circuitry this allows information relating to not yet terminated threads to be retained in powered down storage if not currently being used by the processing circuitry.

It will be appreciated that not all of the primary storage of the processing circuitry needs to be implemented using non-volatile storage circuitry. There could also be some volatile storage circuitry which may be provided to provide faster access to specific information. Nevertheless, by implementing at least some of the primary storage using non-volatile storage circuitry this can greatly reduce power consumption by providing more opportunities for powering down regions of primary storage for relatively short periods of time without needing to incur overheads in performing state saving and restoration.

The non-volatile storage circuitry may be primary storage which is directly accessible by the processing circuitry on an instruction-by-instruction basis.

Various types of primary storage can be implemented using non-volatile storage circuitry. For example, the non-volatile storage circuitry may be used as registers for storing architectural state of the processing circuitry, as a cache, as a scratchpad memory, as prediction structure(s) for storing prediction state used to control speculative execution of instructions by the processing circuitry and/or as random access memory serving as primary storage. The prediction structure(s) could include a branch prediction structure, a data prefetcher structure, an instruction prefetcher structure, or other predictive mechanisms used to control speculative execution. The cache could be a data cache, an instruction cache or a cache of control information such as a translation lookaside buffer (TLB) for caching address translation data. The scratchpad memory could be a data scratchpad memory or an instruction scratchpad memory.

In one example, the processing circuitry may directly obtain operands for execution of the instructions from the non-volatile storage circuitry, and directly store results of the executed instructions to the non-volatile storage circuitry. For example, the non-volatile storage circuitry may serve as registers of the processing circuitry which are directly accessed by the execution units of the processing circuitry to obtain the required operands and to write back the results of executed instructions. This approach would be extremely counter-intuitive to a skilled person since one would normally expect that non-volatile storage would be too slow for use for direct reading of instruction operands or direct writing of instruction results. However, the inventors recognised that with newer non-volatile storage technologies and the increasing demand for processing systems capable of operating on an extremely low power budget regardless of the cost to performance, it can be useful to provide some registers using non-volatile storage so that they can be rapidly powered up and down without needing state saving and restoration, to offer more opportunities for power savings.

In one example, the power control circuitry may control, on a cycle-by-cycle basis, whether a given region of the non-volatile storage circuitry is in a power up state or a power down state. For example, in each cycle the power control circuitry may detect whether there are requests to read or write the information in the given region or whether there is any other reason why the given region needs to be powered up, and in cycles where no requirement to use the information the given region exists, the given region could be powered down. Hence, by using non-volatile storage circuitry for primary storage this enables much more frequent power down decisions to be made on a cycle-by-cycle basis which would not be practical for volatile storage circuitry.

In one example, the processing circuitry may be a multi-threaded processor which may support processing of instructions from two or more different threads of execution. The non-volatile storage circuitry may comprise two or more thread-specific storage regions which are each dedicated for storing information associated with a corresponding thread processed by the processing circuitry. By providing thread-specific storage regions, this makes it more efficient to manage powering down regions of non-volatile storage when information is unused.

For example, while a number of threads may all be in progress, having been initialised by an operating system and not yet terminated, and so the processing circuitry needs to retain the working data and instructions of each of those threads, at any given time not all of the threads may actively be issuing instructions to the execution units of the processing circuitry or requiring a read or write to be serviced in the primary storage. When a given thread is not actively issuing instructions or reading or writing data and there is no other reason to maintain power to that thread's individual storage region, then that thread's individual storage region can be powered down to save energy.

Hence, the power control circuitry may control the given thread-specific storage region associated with a given thread to be in a power down state in a cycle when none of a number of power up conditions is satisfied for the given thread. If any of those power up conditions arises for the given thread in a particular cycle, then the corresponding thread's storage region is powered up. For example, the power up conditions may include at least:
the given thread or a supervisory process requiring access to the given thread-specific storage region. Hence, when the given thread (or a supervisory process supervising the thread) requires access to the given thread-specific storage region, then that region is powered up; and information to be written to the given thread-specific storage region being returned in response to a memory access initiated in an earlier cycle. Hence, if information has been returned from memory in response to an earlier issued read/load request, then the corresponding thread-specific storage region may be powered up to allow the loaded information (data or instructions) to be written to the thread's storage region.

Another example of a power up condition could be when there is a request from an external source (external to the processing circuitry) for access to an address corresponding to information stored in the thread-specific storage region associated with a thread for which otherwise the power up conditions would not have been satisfied. For example, if a second processing element requests access to an address of information stored in the given thread-specific storage region then that storage region may need to be powered up to allow that external request to be serviced.

It will be appreciated that there could also be other power up conditions which may arise for a given thread to cause that thread's individual storage region of the non-volatile primary storage to be powered up.

On the other hand, in cycles when none of the power up conditions arise for a given thread, that thread's thread-specific storage region could be powered down to save energy. The powering up/down of the thread-specific storage region can happen at short intervals, even at the granularity of individual cycles, because the use of non-volatile storage means that there is no need for state saving/restoration operations.

The thread-specific storage regions could be implemented for a number of different types of primary storage. For example, these could be thread-specific sets of register storage for storing sets of architectural state associated with different threads. Also, the thread-specific storage regions could be regions (e.g. cache ways) of a cache, or thread-specific regions within on-chip RAM.

In some examples, when executing a number of active threads including a given thread, only the given thread may be allowed to access its own thread-specific storage region, and no other process may be allowed to access the given thread's thread-specific storage region.

In other implementations, the given thread associated with a given thread-specific storage region may not be the only software process which can access that region of the non-volatile storage, as a supervisory process for supervising the given thread may be allowed to access the thread-specific storage region associated with the given thread. For example, the supervisory process could be an operating system supervising execution of a number of applications, or a hypervisor supervising execution of a number of guest operating systems or virtual machines. Hence, when processing a number of active threads including a given thread, the thread-specific storage region associated with the given thread may be accessible to the given thread itself but may be inaccessible to active threads other than the given thread. On the other hand, when processing a supervisory process for supervising the given thread, the thread-specific storage regions for any threads supervised by the supervisory process may be accessible to the supervisory process.

In addition to the thread-specific storage regions, the apparatus may also comprise a shared storage region of the primary storage which is accessible to more than one of the threads. The shared storage region could be implemented using either volatile storage circuitry or non-volatile storage circuitry. In some cases, since the shared storage region may be expected to be accessed more frequently than the thread-specific storage regions, because the shared storage region may be accessed by any of the threads, it may be desirable to use volatile storage circuitry for the shared region, as it is less likely that the shared storage region will be unneeded and this can improve performance by reducing access times. Alternatively, if power saving is a more important consideration, then the shared storage region could also be implemented using non-volatile storage to allow further power savings by powering down regions of shared storage when not needed for any thread.

For thread-specific storage regions of non-volatile storage used as register storage, this enables the storage circuitry for storing architectural state data for the thread to be powered down during periods when the corresponding thread is not actively issuing instructions or reading or writing its architectural state, saving energy.

In an example where the non-volatile storage circuitry comprises a cache which includes thread-specific storage regions, when a thread-specific storage region for a given thread is powered down, and that region stores dirty information (which differs from the corresponding data for the same address held in subsequent levels of a memory system), there is no need to write back the dirty information to memory. This is because, unlike for volatile storage, when the non-volatile storage region is powered down, the dirty information will be retained, and so if a processing element tries to access the same address later, the given thread-specific storage region can simply be powered up again to allow the dirty information to be accessed, which provides the most up to date version of the data associated with the specified address. By avoiding a write back to underlying memory, this can reduce memory bandwidth requirements and save power.

For the cache example, in response to a request issued by another processing element other than the processing circuitry, when the request specifies an address corresponding to information in a currently powered down thread-specific storage region, that thread-specific storage region of the cache can be powered up to allow the external request to be serviced. For example, the external request could be a snoop request issued according to a coherency protocol, in response to an access to the specified address triggered by another processing element. The receipt of such an external request may be one of the power up conditions used to decide when the thread-specific storage region of a cache needs to be powered up.

In some examples, the non-volatile storage circuitry may have a number of hardware thread storage regions each to store context information associated with a corresponding one of a plurality of hardware threads, and the processing circuitry may support processing of instructions from at least one active thread selected from among the plurality of hardware threads. The maximum number of active threads supported may be less than the maximum number of hardware threads supported.

For example, the processing circuitry may have register storage (implemented using either volatile or non-volatile storage) for storing architectural state for either a single thread, or multiple threads. Instructions relating to the active threads whose architectural state is stored in the register storage may be allowed to be fetched for processing. However, the non-volatile storage circuitry (acting as primary storage, e.g. RAM) may store context information for a certain number of hardware threads greater than the number of active threads (one or many) supported by the processing circuitry. A thread scheduler may select which of the hardware threads are scheduled as the active threads.

When a context switch from a first thread to a second thread occurs, the register state of the first thread may be copied from the registers to the hardware thread storage region in the non-volatile storage associated with the first thread, and register state of the second thread may be copied from the hardware thread storage region associated with the second thread to the registers. The hardware thread storage regions may be powered down when not required. For example, in cycles when hardware thread state is being saved to, or restored from, a given hardware thread storage region, the given hardware thread storage region may be powered up, but otherwise the given thread storage region may be powered down.

If the hardware thread storage regions were implemented using volatile storage technology such as SRAM, this would tend to limit the maximum number of hardware threads supported, since maintaining each thread's set of context information would incur a power cost in powering up the SRAM cells storing the context for that thread, even when that thread is not selected as one of the active threads. In contrast, by using non-volatile storage for the hardware thread storage regions, this enables the maximum number of hardware threads to be much greater for a given power budget, as when not context switching hardware threads there is no need to maintain power to the hardware thread storage regions but the contents of those regions can still be maintained.

Sometimes, while processing a given thread of execution, the processing circuitry may encounter a stall event which indicates that the thread cannot make forward progress until the stall event has been resolved. In a typical processing system, as the architectural state, working data and instructions of the given thread may be stored in registers, a cache or other structure implemented using volatile storage, and that information would need to be retained for when the processing of the thread can continue after the stall has been resolved, and the period when the thread is stalled may be too short to justify state saving/restoration, then typically during the period when the thread is stalled the storage regions storing the thread's state/instructions/data would still be powered up. Hence, typical processing systems do not make use of power saving opportunities to power down regions of information for storing information associated with a given thread while a stall event is being resolved.

In contrast, when the primary storage of the processor is implemented using non-volatile storage then powering down the storage is much faster as there is no need for state saving, and so when a given thread encounters a stall event, the power control circuitry can power down at least part of a region of the non-volatile storage circuitry which stores information associated with the stalled thread, until the stall can be resolved. This enables much more frequent windows of power savings when threads are stalled. This approach can be particularly useful if individual threads have their own thread-specific storage regions in the non-volatile storage circuitry, as this makes it more straightforward to identify which part of the non-volatile storage can be powered down when a given thread is stalled.

For example, the stall event could be any one or more of the following: a memory access requiring latency longer than a given threshold; a miss in a given level of cache; a memory access which requires access to data stored in secondary storage; an event indicative of the given thread waiting for a synchronisation variable (e.g. a lock) to indicate that the given thread is allowed to access a shared variable for which exclusive access to the shared variable is controlled based on the synchronisation variable; an event indicative of the given thread waiting for a message to be received from another thread; and execution of a wait-for-event instruction by the given thread. All of these events may lead to the thread stalling for a period of time, when the thread cannot make forward progress until the stall event has been resolved. Hence, these events provides an opportunity for power savings by powering down the region of non-volatile storage storing the stalled thread's instructions/data or architectural state.

Another opportunity for power savings may be in a system where the processing circuitry supports processing of instructions in one of a number of operating states. For example, the processing circuitry may have operating states with different privilege levels, and different software processes may execute at the respective privilege levels. For example, application-level software may execute in a least privileged operating state, operating system or virtual machine software may execute at a more privileged operating state, and hypervisor software for managing the virtual machines or operating systems may operate at an even more privileged operating state. Typically each of the software processes executing at the different operating states may have its own working set of data, set of instructions, and architectural register state. In a typical system using volatile primary storage, when switching between operating states, all of the information associated with the respective operating states needs to be retained in powered up storage cells. If any registers are shared for access at different operating states, then some state saving/restoration may be needed when switching operating state.

However, by using non-volatile memory primary storage, this means that the instructions, working data and/or architectural state associated with processes executing at different operating states can be held in respective regions of non-volatile storage, which can easily be powered up/down without state saving/restoration while still retaining the information. When the processing circuitry is processing instructions in a current operating state, the power control circuitry could power down a region of the non-volatile storage circuitry which is for storing information associated with at least one operating state other than the current operating state. Hence, power can be saved by powering down storage regions which store state associated with exception levels or other operating states other than the current operating state.

In another example, power savings may be provided by powering down non-volatile storage which stores a subset of architectural state not currently required for a given thread or portion of a thread being processed. For example, while the instruction set architecture supported by the processing circuitry may define a certain number of registers which have to be provided in hardware for storing architectural state data, not all of these registers may be used by a particular program. For example, the registers may include floating-point registers or vector registers, or specific types of control state, which may not be needed for all programs (these are just some examples). Hence, for program code which does not use a given subset of registers, the power control circuitry may power down the corresponding regions of non-volatile storage while that program code is actively being processed. These regions may be powered down even if those registers are still storing register state which may be needed for earlier parts of the program code or for other threads of execution, as the state will be retained in the non-volatile storage and so there is no need to save the state to memory before powering down the registers.

Hence, in general the non-volatile storage circuitry may comprise registers for storing architectural state of the processing circuitry, and in response to a thread or portion of a thread which does not require a subset of the architectural state, the power control circuitry may power down a region of the non-volatile storage for storing that subset of the architectural state.

The subset of the architectural state for which the corresponding region of non-volatile storage can be powered down when not needed for a thread or portion of thread could comprise at least one of the following: floating-point register state to store floating-point values or floating-point control state for controlling processing of the floating-point values; vector register state to store vector values or vector control state for controlling processing of the vector values; control register state to initialize and control system functions; status register state comprising indications of historical events (e.g. exceptions, errors and/or performance indications); and control register state comprising control information of an operating state other than the current operating state.

The determination of whether a particular thread or portion of a thread requires a particular subset of architectural state could be made in different ways by the power control circuitry. In one example, the power control circuitry may make this decision based on hint information specified by the program code for the thread or portion of the thread. For example, program code could be annotated by a compiler so that the machine binary for that program code includes an indication of whether a particular subset of architectural state will be used by the program. This hint can be used by the power control circuitry to control shutting off the power to a given subset of registers if unneeded. Alternatively, rather than identifying whether registers are used at compilation time, the processing circuitry may have monitoring circuitry for collecting monitoring information about the operation of a given thread. Hence, the decision on whether to continue to power a given set of registers of an active thread may be made based on monitoring information collected by the monitoring circuitry at runtime on a previous instance of executing that thread or that portion of the thread.

The techniques discussed above can be applied to the primary storage used by a main processing element such as a CPU (Central Processing Unit). However, the non-volatile storage circuitry could also be used for a primary storage structure (e.g. registers, cache or TLB) in a co-processor or a hardware accelerator, to which the main processor can offload certain processing functionality which can be performed more efficiently by the co-processor or a hardware accelerator. For example, the co-processor or hardware accelerator may have bespoke hardware dedicated to performing certain processing functions faster than could be done using general purpose instructions on the main processor. For example, the coprocessor or hardware accelerator could be a graphics processing unit, a floating-point processing unit dedicated to floating-point operations, a vector processing unit dedicated to performing vector operations, or hardware accelerators for specific tasks such as cryptographic operations, digital signal processing, artificial intelligence, data compression, regular expression searching, etc.

Hence, in a cycle when the co-processor or the hardware accelerator is unused by the main processor, the power control circuitry could power down the primary storage structure(s) of the co-processor or the hardware accelerator. While in systems using volatile storage for the co-processor or hardware accelerator storage, this storage could only be powered down if the co-processor or hardware accelerator is being decommissioned and no longer needs to store any active state, with the present technique where the primary storage structure of the co-processor hardware accelerator is implemented using non-volatile storage, the registers/cache/TLB etc. of the co-processor or hardware accelerator can be powered down for short periods when not actively being used by the main processor, even if the state still needs to be retained for when the co-processor or hardware accelerator will continue processing in a future cycle. Hence, even during relatively short windows of inactivity, the hardware accelerator or co-processor storage can be powered down to save energy.

It will be appreciated that some of the techniques discussed above, such as powering down regions storing information associated with threads not currently issuing instructions or reading/writing the storage, powering down storage regions storing information associated with unused subsets of registers, or powering down storage regions associated with processes operating in an operating state other than the current operating state, could also be applied to the hardware accelerator or co-processor, not just for a main processor such as a CPU.

FIG. 1 schematically illustrates an example of a data processing system 2 which has a number of processing elements, including main processing elements (CPUs) 4 and hardware accelerators/co-processors 12. The processing elements 4, 12 execute data processing in response to instructions. The CPUs 4 include a number of internal primary storage units including a register file 6 for storing architectural state, an instruction cache 8 for storing instructions fetched upon a memory system and a data cache 10 for storing data from the memory system. The hardware accelerators/co-processors 12 may be provided for carrying out dedicated processing functions on demand from the CPUs 4, such as graphics operations, vector processing, floating-point operations, cryptographic operations, etc. The accelerators 12 also include register files 16 and caches 18.

The CPUs 4 and accelerators 12 share access to a number of shared storage units including a level 2 cache 20 and random access memory (RAM) 22 which are accessible via an internal bus 24. If a data request misses in the shared level 2 cache then the data can be fetched from main memory 26 accessed via a memory controller 28 coupled to a memory bus 30. The processing elements 4, 12 also have access to secondary storage via input/output channels 32 accessible via a bus bridge 34 coupled to the internal bus 24.

The register files 6, 16, caches 8, 10, 18, 20 and RAM 22 are all examples of primary storage which is accessible by the CPUs 4 or hardware accelerators 12 on an instruction-by-instruction basis. In addition to the types of storage shown in FIG. 1, other examples of primary storage units which could be made non-volatile include a translation lookaside buffer (TLB) for caching address translation data from the memory system, or a scratchpad memory which is directly accessible to a CPU in a similar way to the instructional data cache 8, 10, but which unlike the caches does not implement a replacement policy so that data allocated to an address mapped to the scratchpad memory will remain stored in the scratchpad memory until explicitly overwritten by the processor, rather than being replaced dynamically in a cache based on usage recency or some other cache allocation policy. Also, the primary storage units may include predictive storage structures for storing prediction state used to predict aspects of program execution (such as branch outcomes, branch target addresses, data/instruction fetch addresses, etc.) which can be used to perform speculative operations before the actual behaviour is known. For example, the predictive storage structure may be a branch prediction state store, a prefetcher state store, etc.

Hence, the primary storage is used for storing instructions, working data and architectural state needed to support execution when a program is running, as well as any control data used by the pipeline to control execution of the program, such as address translation state and prediction state. In contrast, secondary storage accessible via the input/output channels 32 is used for long term backup storage of information which has not specifically been requested by the CPU/accelerator to be copied into primary storage, such as code/data relating to programs not currently being executed and data defining user items not currently needed, such as images, documents, etc.

In the techniques discussed in this application at least some of the primary storage units 6, 8, 10, 16, 18, 20, 22 may be implemented using non-volatile memory storage. This provides the opportunity to quickly remove power supply to these non-volatile storage units without losing the information stored in those storage units, which enables greater power savings. The subsequent examples show a number of potential uses of non-volatile storage circuitry as primary storage of the processor.

Figure 2:
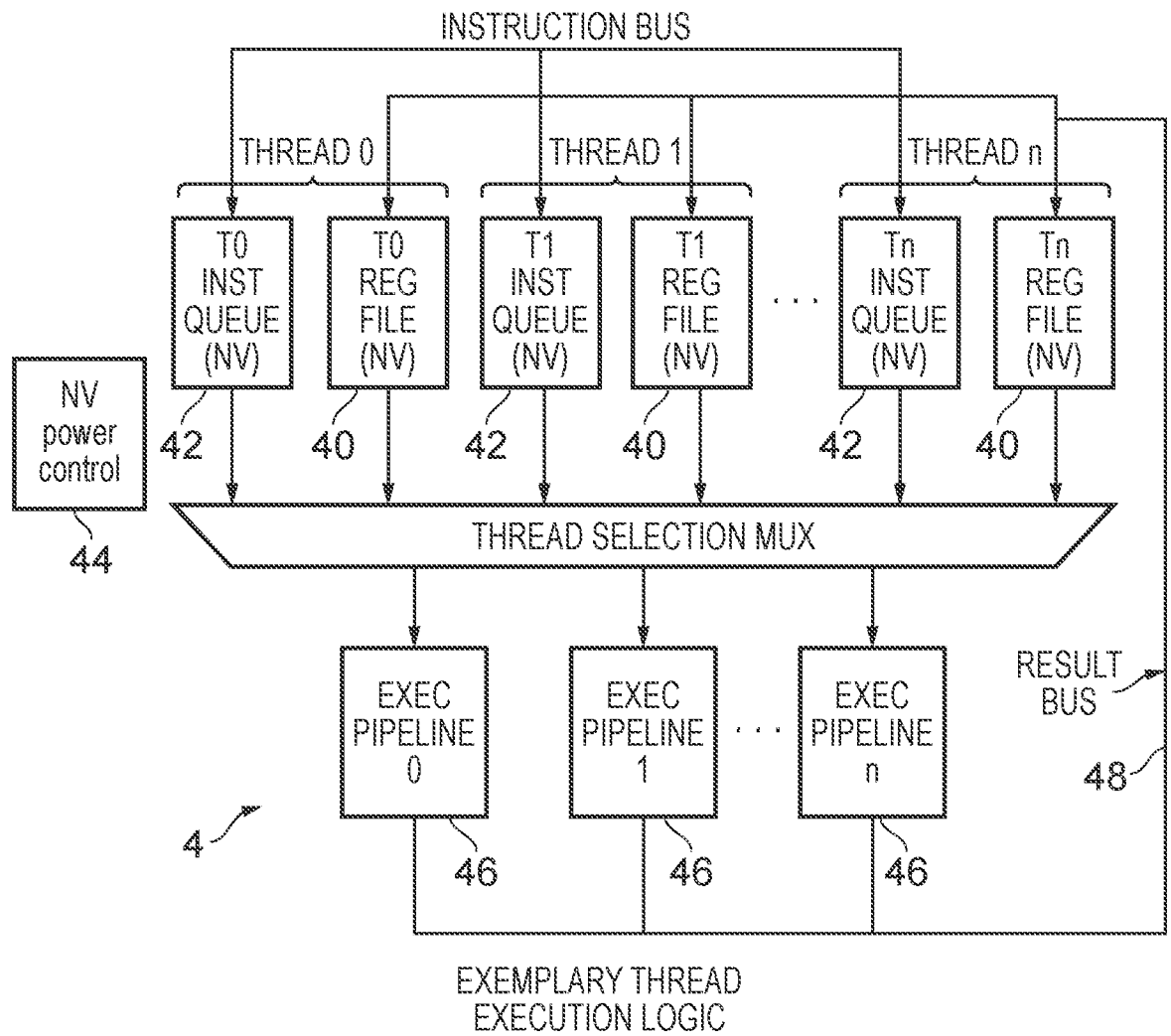
FIG. 2 shows an example where each of a number of threads processed by the processing circuitry has a corresponding thread-specific register storage region implemented using non-volatile storage.

FIG. 2 shows an example of the registers and execution units of a multi-threaded processing element 4 which supports execution of instructions from a certain number of threads 0 to n. The processing element 4 has a number of thread-specific register storage regions 40 and thread-specific instructions queues 42 each dedicated to an individual thread. The instruction queues 42 and register files 40 for the respective threads may all be implemented using non-volatile storage circuitry. A multi-threaded processor maintains a number of instances of complete architectural state for each of the threads in progress. The number of threads supported at a time may be relatively high for some implementations, e.g. as high as 32 or 64 threads. In a typical system, the sets of architectural state for each thread may be stored in volatile storage such as SRAM. Even if the registers of the pipeline within the CPU themselves cannot store all the sets of thread state, nevertheless volatile storage within a cache or RAM may be used to store the state relating to initialised threads that are in progress, and this volatile storage consumes power to maintain each thread's set of architectural state, even when a thread in progress is not currently issuing any instructions or reading/writing to the volatile storage.

In contrast to such typical systems, FIG. 2 shows an approach where non-volatile storage blocks 40, 42 are used as the register file and instruction queues for each thread. This means that when a given thread is not actively issuing instructions or reading/writing data, the given thread's register file 40 and instruction queue 42 can simply be powered off to save power when not in immediate use (while that thread nevertheless remains in progress and the state/instructions of that thread still need to be retained). Non-volatile power control circuitry 44 may be provided to control the timing at which individual pieces of primary storage are powered up or down for a given thread. The timing of powering up/down the non-volatile thread-specific storage regions 40, 42 for an individual thread may be controlled on a cycle-by-cycle basis, even supporting power down windows as short as a few clock cycles, which would not be possible with volatile storage. This allows much greater opportunity for power savings.

Hence, FIG. 2 shows an example where the non-volatile storage includes some storage regions 40 from which the execution units 46 directly obtain operands for the instructions being executed and to which the results of those executing instructions are directly written back via a result bus 48. In typical systems such storage would be implemented using volatile storage, but here this is done with non-volatile storage.

In summary, in a multithreaded processor, the state for each thread may be located in non-volatile memory blocks 40, or "state blocks," including any register file, program counter, stack pointer, etc. Each thread has a state block 40, so there would be multiple state blocks, one for each thread. When a thread is issuing instructions, or when an instruction is writing a result to the state block, or when the load unit is delivering an operand to the thread, or when a supervisory process requires access to the state block, the state block for this thread is powered up. For any cycle in which none of these events (or any other event requiring access to the thread's state block) is occurring the state block may be powered down.

Figure 3:
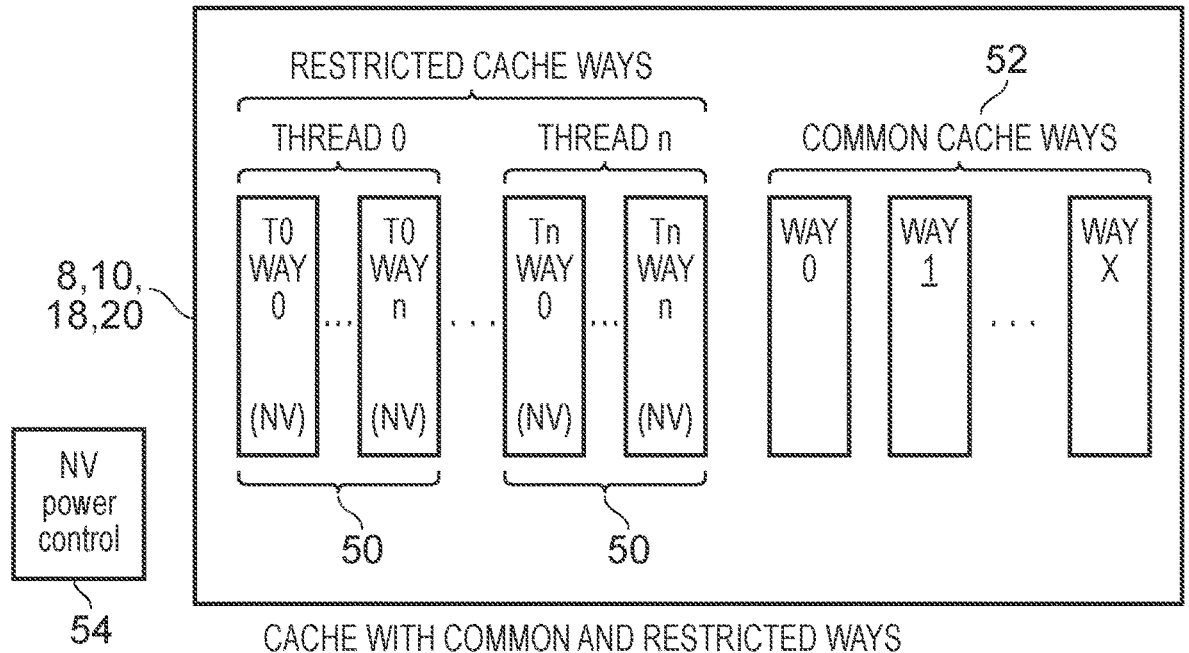
FIG. 3 shows an example with thread-specific cache ways implemented using non-volatile storage.

FIG. 3 shows another example use of non-volatile storage as primary storage of the processing circuitry. In this example, the cache 8, 10, 18, 20 of a CPU 4 or a hardware accelerator or co-processor 12 may be implemented using a number of thread-specific storage regions (restricted cache ways) 50 each dedicated to an individual thread, and implemented using non-volatile storage. In addition, the cache 8, 10, 18, 20 could also include some common cache ways 52 which are shared between threads and could be implemented either using non-volatile or volatile storage. In cycles when a given thread is not currently accessing the cache and there is no other reason to maintain access to a given thread's specific storage region 50 (e.g. there is no request for supervisory software to access a cache or for an access caused by an external agent) then that thread's storage region 50 may be powered down by non-volatile power control circuitry 54 to save energy. Even if information stored in a thread's individual region is dirty (it differs from the underlying data from the same address at another location of the memory system) it is possible to power down thread-specific storage region 50 anyway without performing any cleaning of the dirty data to the memory system, which saves energy and reduces bandwidth on memory channels. Even if while powered down, another process or external agent requests access to an address whose dirty data is in the powered down storage region 50, the access request or snoop request for that address may cause the corresponding thread-specific storage region 50 to be powered up again to give access to the dirty data, as the dirty data will be preserved in the non-volatile storage region even if power is not supplied. Hence, by avoiding unnecessary cleaning operations this can also provide a further energy saving and also frees up memory bandwidth for other accesses.

In summary, in a multithreaded processor, each thread may access one or more shared cache regions 52 of volatile or non-volatile memory and a separate non-shared cache 50 (herein an "exclusive thread cache") of non-volatile memory which is dedicated to that particular thread. During any cycle in which the thread is not accessing the exclusive thread cache 50 or a supervisory process is not accessing the exclusive thread cache 50, the exclusive thread cache is powered down.

The provision of a shared cache 52 can be more efficient for data that needs to be accessed by multiple threads, as this avoids duplication of shared data in multiple threads' exclusive thread caches 50.

A similar approach can be used for TLBs or other address translation caches for caching address translation data (e.g. page table entries) from memory. That is, the cache in the example of FIG. 3 could be a TLB. A shared TLB may or may not be included. The exclusive thread translation cache 50 for a given thread may be powered down in any cycle in which the thread is not performing a memory access requiring translation, no TLB maintenance operation has been requested that would require access to the exclusive translation cache, and no supervisory process requires access to the exclusive thread translation cache 50.

Also, a similar approach could be used for prediction structures of the processor core 4, such as branch prediction tables, data or instruction prefetcher tables, or other prediction mechanisms. Such prediction mechanisms may maintain a storage structure which stores prediction state, which is updated based on actual outcomes of instructions executed by the processor core 4, and is used to predict the outcomes of fetched instructions before their actual instruction behaviour is known. In a similar way to the cache example of FIG. 3, the prediction structure could be partitioned into thread-specific regions 50 implemented in non-volatile memory, and the thread-specific region 50 associated with a given thread can be powered down when the given thread is not currently issuing instructions or reading/writing the prediction state. While the thread-specific region 50 is powered down, the corresponding prediction state is still retained in the non-volatile storage region ready for use in a subsequent cycle when a prediction needs to be made for a given thread, so powering down the thread-specific region of prediction storage does not affect performance or prediction success rate. This provides another opportunity for power savings.

Although it would be possible to provide a shared region 52 of the predictive storage, in addition to the thread-specific regions 50, this is not essential, and may be less preferred as unlike for the cache example, for a prediction store there is likely to be less benefit from sharing prediction state across threads as the predictive behaviour may be quite different for the same address in different threads of execution. Hence, in some implementations the prediction state store may not have a shared region 52.

Figure 4:
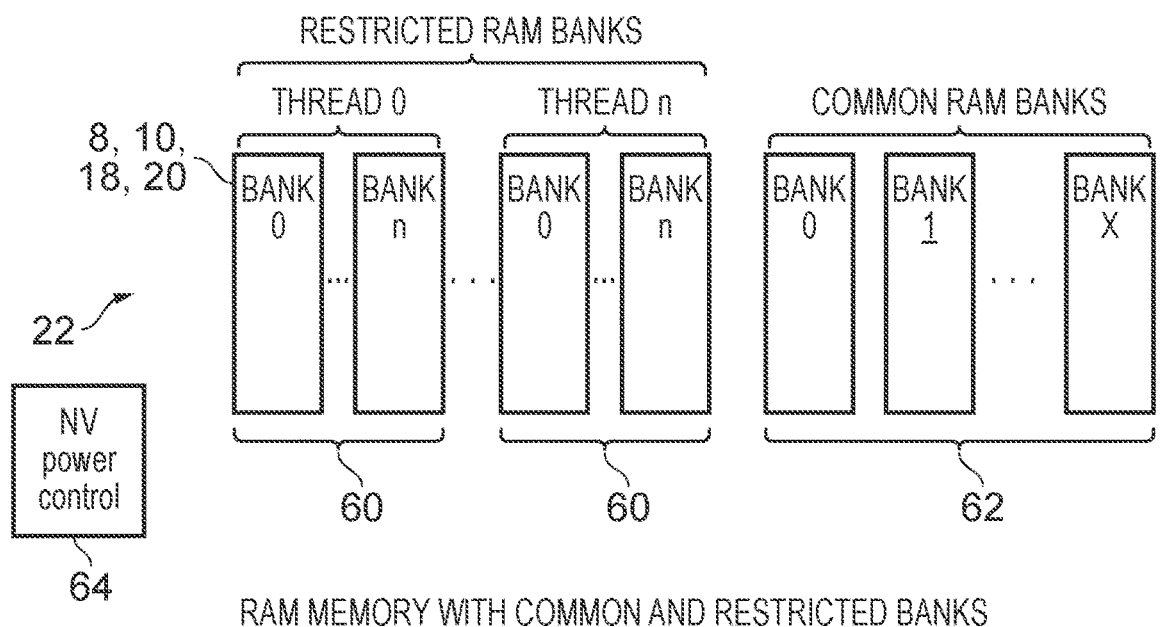
FIG. 4 shows an example in which thread-specific regions of random access memory (RAM) are provided using non-volatile storage.

In a similar way, FIG. 4 shows an example of how the on-chip RAM 22 can be divided into exclusive thread memory 60 accessible only by an associated thread or a supervisory process, and shared RAM 62 which can be accessed by any of multiple threads. In a similar way to the cache example, during cycles in which the associated thread or the supervisory process is not accessing the exclusive thread memory 60 for a particular thread, non-volatile power control circuitry 64 may power down that region of exclusive thread memory 60 to save power. Nevertheless, when threads need to interact using shared data then the common RAM bank 62 can be used.

In the examples of FIGS. 3 and 4, when a given thread's exclusive region 50, 60 of the cache or memory has been powered down, then a number of events may cause the region to be powered up again by the power control circuitry 54, 64. These events could include a read/write request issued either by the thread associated with that thread-specific region 50, 60 or by a supervisory access, or could include an request received from an external source, such as another processing element or external device, specifying an address of information stored in the thread-specific region 50, 60. For example, this external request may be a snoop request issued according to a coherency protocol. Also, other examples of events causing power up could be an external interrupt, or the notification that a message has been received from an external agent.

Figure 5:
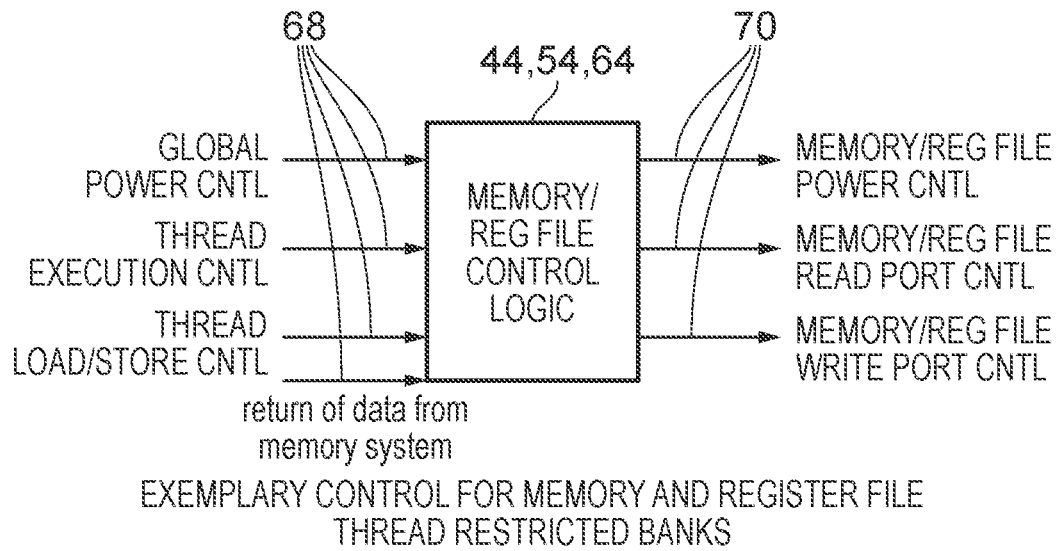
FIG. 5 shows an example of control logic for controlling whether regions of non-volatile primary storage are powered up or down depending on activity of the processing circuitry.

Hence, as shown in FIG. 5, the non-volatile power control circuitry 44, 54, 64 in the examples of FIGS. 2-4 may receive a number of inputs 68 used to control whether a given region of non-volatile storage is in a power up state or power down state. It will be appreciated that the power up and power down states may be any two power states among two or more power states supported for the non-volatile storage region, where the storage circuitry consumes less power in the power down state than in the power up state. In some cases, there could be more than two power states associated with different levels of power consumption and the control inputs 68 may be used to control transitions between any two of these states. In some examples, the power down state may be a state in which the power supply to the non-volatile storage region is cut off.

The control inputs may include a global power control signal indicating whether there is any active processing at the corresponding processing element, which may be used to power down the corresponding storage region if there is no active processing at all. In addition, the power control inputs 68 may include signals indicating thread-specific events, such as a thread execution control signal indicating which threads are actively issuing instructions, and a thread load control signal indicating which threads are requesting load/store operations to load information from a cache or memory or store information to the cache or memory. Another input could be a data return signal indicating which threads have had data returned from the memory system in response to an earlier load operation issued by the thread. Based on the various control inputs 68, the power control circuitry 44, 54, 64 generates power output control signals 70 which are issued to the non-volatile storage itself as well as to any read/write ports for interacting with the storage, to control whether those elements are powered up or down. The power control logic 44, 54, 64 may control whether non-volatile storage regions are powered up or down on a cycle-by-cycle basis so that it is possible to power down storage regions for relatively few cycles at a time, with a fast transition between power up and power down states based on the individual instruction-by-instruction activity of individual threads for example.

Figure 6:
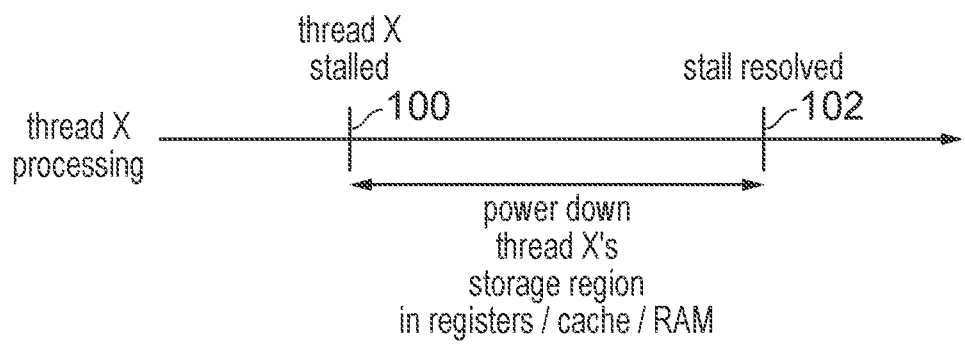
FIG. 6 shows an example of powering down a given thread's storage region while the thread is stalled.

In other examples, it may be preferred not to incur the overhead of detecting individual cycle-by-cycle activity of a thread, but instead control power up/down at a more coarse-grained level. For example, primary storage structures can be powered down in response to certain stall events during the processing of a given thread which indicate that the thread is unlikely to be able to make forward progress for a time. Hence, as shown in FIG. 6, when a given thread X is being processed, and encounters a stall event at point 100, a non-volatile storage region used as primary storage for storing information associated with thread X could then be powered down. When the stall is resolved at point 102, the threads storage could then be powered up again.

For example, the stall event could be any of the following events:
thread X issuing a memory access request which causes a miss in a certain level of cache (e.g. a miss in the shared level 2 cache 20, requiring access to slower memory 26, or a miss in the TLB of the processor core 4, which therefore requires a page table walk to fetch address translation data from memory);
a memory access requiring latency longer than a given threshold;
a memory access which requires access to data in secondary storage via I/O channels 32;
thread X identifying that a synchronisation variable (e.g. a lock) indicates that another thread currently holds the lock and so has exclusive access to a shared variable, and so the thread X will have to wait for the other thread to relinquish the lock before it can gain access to the shared variable;
the thread X waiting for a message to be received from another thread or an external device, before being able to proceed with subsequent processing; and/or
execution of a wait-for-event (WFE) instruction by the given thread X. When a WFE instruction is executed, the processing circuitry does not execute any further instructions for the thread until an event register indicates that one of a certain class of event types has occurred. The events which cause the event register to be set by the hardware may include the following: receipt of an interrupt; a debug entry request made to the processor when debug is enabled, or another processor issuing a "Send Event" notification, for example.

Hence, for all these types of events, and for other examples of stall events, the thread X may not be able to make any forward progress until the stall is resolved, so when the stall event is detected, the power control circuitry can power down regions of non-volatile primary storage used to store information for the stalled thread X. This can be done without needing to save thread X's internal state to a powered up region of (volatile or non-volatile) storage because the state will be preserved in the powered down non-volatile storage region, and so this power down operation incurs little overhead. Even if the stall is resolved shortly after the non-volatile storage region is powered down, as there is no state restoration overhead the non-volatile storage region can simply be powered up again with little cost to performance.

Figure 7:
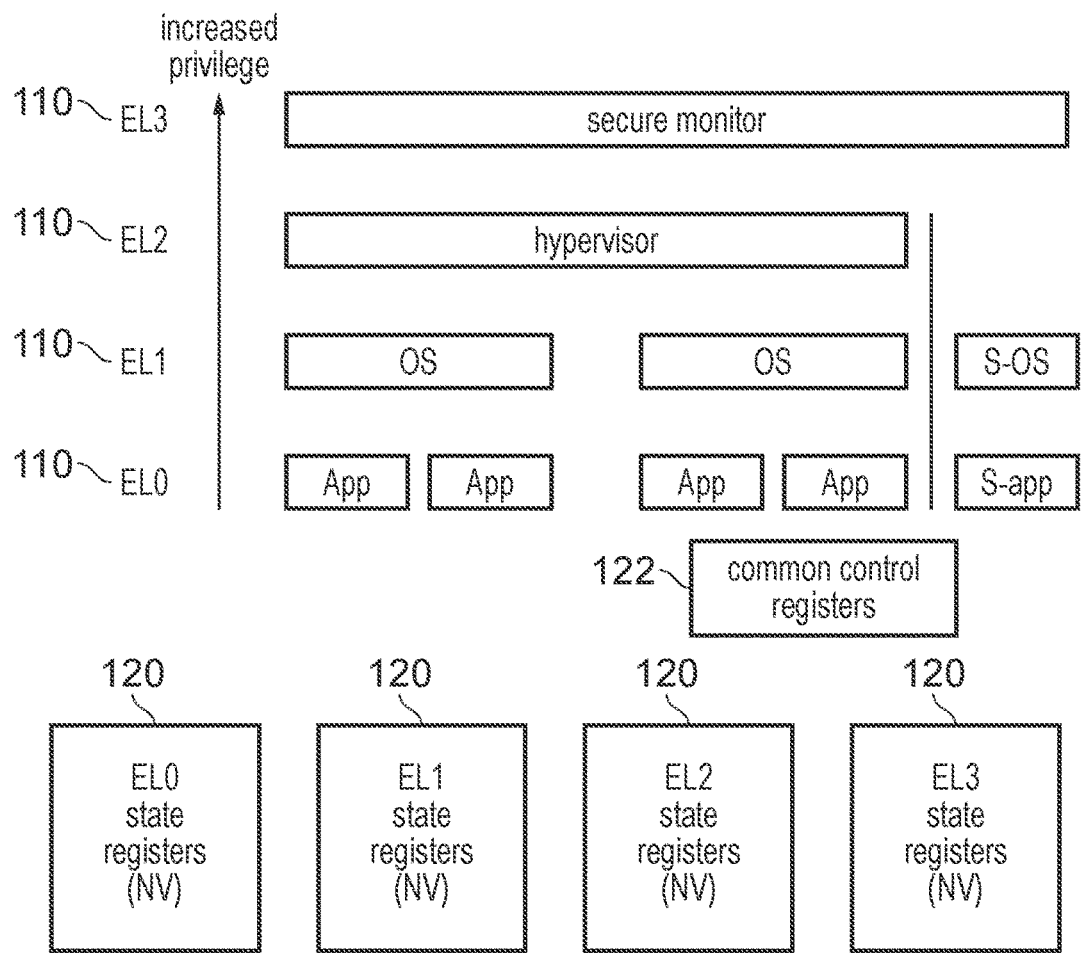
FIG. 7 shows an example of regions of non-volatile storage for storing state associated with different operating states.

FIG. 7 shows another example, in which non-volatile state storage blocks 120 are maintained for different operating states, such as exception levels (EL). As shown in FIG. 7, the processing element 4 may support processing at a number of different exception levels 110 (EL0-EL3) which may be associated with different levels of privilege (in this example EL3 has the greatest privilege and EL0 has the least privilege). For example, exception level EL0 may be for executing application code, exception level EL1 may be for executing operating system code, exception level EL2 may be for executing hypervisor code and exception level EL3 may be for executing secure monitor code for managing transitions between secure and less secure operating states. Each of the respective software processes executing at the different exception levels may have their own set of architectural state, but when in any particular exception level, a lot of this state may be unused because the process at a different exception level to the current exception level is not currently issuing instructions for execution. In a typical processing system using volatile primary storage, each of the sets of architectural state associated with the processes at the different operating states would need to be maintained within SRAM or other volatile storage, even when the processor is not currently executing software from a given exception level, so the storage of architectural state associated with a process at an exception level other than the current exception level still consumes power.

In contrast, as shown in FIG. 7 a number of register state storage regions can be provided using non-volatile storage 120, each dedicated to storing state for a given exception level. With this approach, when processing code at exception level EL1 for example, the registers 120 associated with EL0, EL2 or EL3 can be powered off when not in use, while still retaining state associated with these exception levels. Note that in addition to the exception level-specific registers 120 there could also be some common control registers 122 which remain powered regardless of the current exception level, which may store control state required in all of the exception levels.

While all of the examples shown above are discussed in respect to a CPU 4 accessing the non-volatile storage, similar examples can be used for operations performed by the hardware accelerator or co-processors. Hence, register files, caches or other structures in co-processors or hardware accelerators may benefit also from being powered down easily and quickly while retaining their contents.

Figure 8:
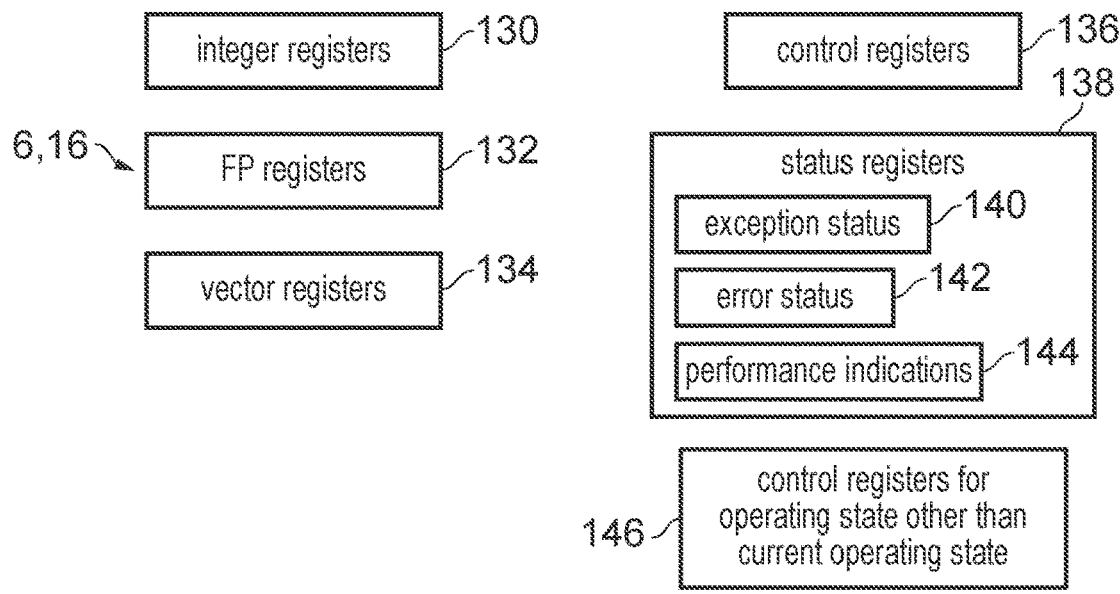
FIG. 8 shows an example of different subsets of architectural registers which can be implemented using non-volatile storage so that they can be powered down when processing program code which does not require that particular subset of registers.

As shown in FIG. 8, within the register file 6, 16 of a given processing element 4, 12 there may be a number of subsets of registers of different types for storing specific types of architectural state. For example, the registers may include:

integer registers 130 for storing integer operands;
floating-point registers 132 for storing floating-point operands and control state for controlling floating-point processing;
vector registers 134 for storing vector operands comprising multiple data elements, and for storing vector control state for controlling vector processing;
control registers 136 for storing control state data for controlling the operation of the processor;
status registers 138 for storing information about historic events encountered by the processor, such as exception status information 140 on previously occurring exceptions, error status information 142 indicating any faults or errors that may have occurred and performance indications 144 for tracking performance of the processor; and/or
control registers 146 for storing information for use by operating states other than the current operating state.

Not all software needs all of the types of register shown in FIG. 8. For example, while most software may use the integer registers 130, software which does not involve any floating-point or vector processing need not use the floating-point registers 132 or the vector registers 134. Similarly, some types of control state information 136, or the status registers 138, may not be used by some types of software. Also, while executing code at one operating state then the control registers 146 for other operating states may not be needed.

Hence, while performing processing from a given thread of execution (or a portion of a thread) which does not require access to a particular subset of the architectural registers defined in an instruction set architecture, the non-volatile storage circuitry associated with the unneeded registers could be powered off while still retaining the information in those registers in case a thread needs access to that information later. Other registers used by the current thread may still be powered up.

For example, software binaries could be annotated with hint information to indicate that the software will not be using the floating-point registers 132, say, and the power control circuitry could use this hint to determine that it can power off the floating-point registers when switching to that software. Even if other processes have previously stored information to the floating-point registers 132, when the floating-point registers 132 are powered off there is no need to save the previous floating-point state to memory, as the non-volatile storage retains the information even when powered down. A similar example could be applied to the other types of registers shown in FIG. 8.

Also, in some cases even if the software binary is not annotated with hints, the performance indications 144 or other monitoring information could be used to track which threads or portions of threads are using particular subsets of registers, and this monitoring information could be used by the power control circuitry to determine which registers can be powered down if unused by a given section of program code to be executed.

Figure 9:
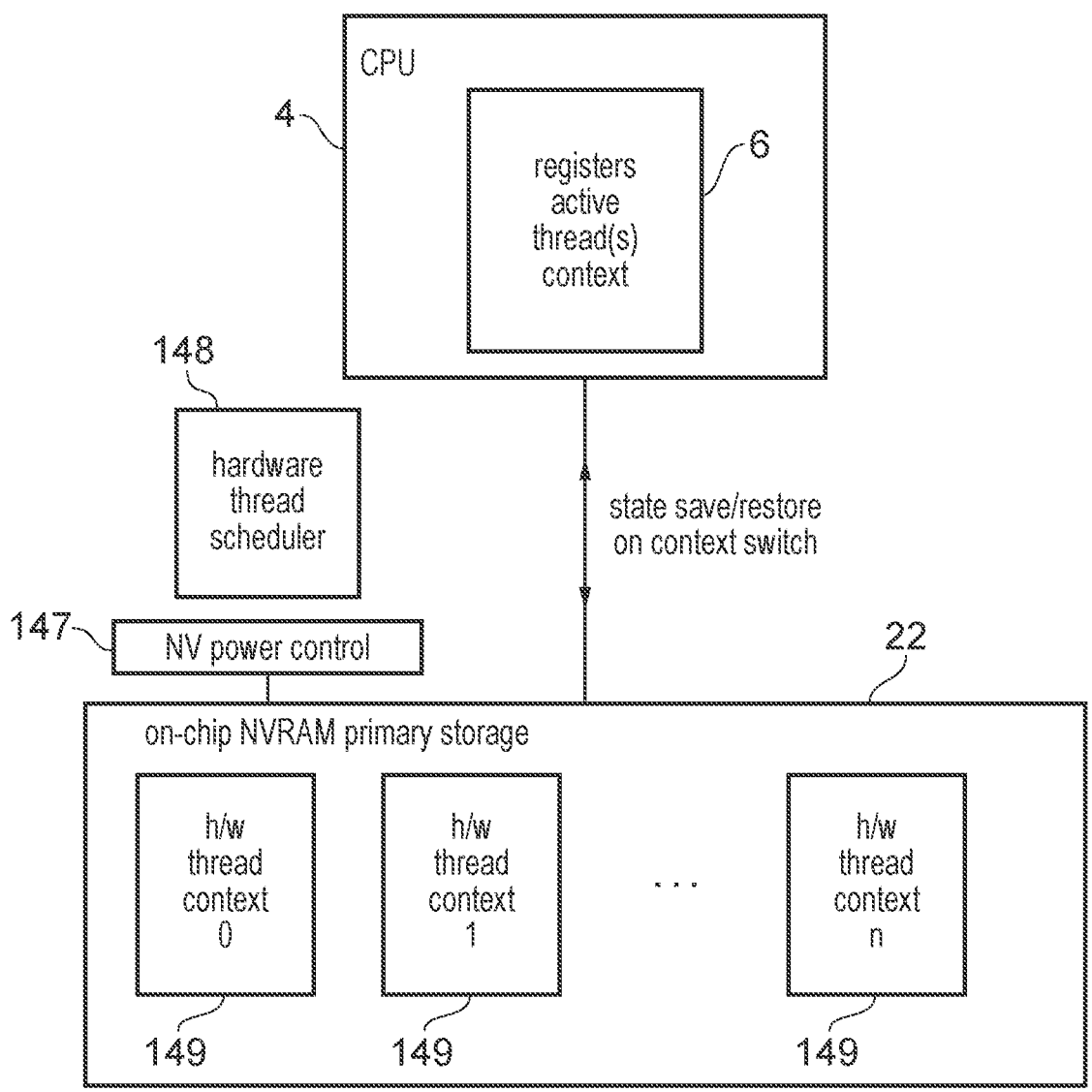
FIG. 9 illustrates use of non-volatile storage for storing context associated with hardware threads.

FIG. 9 shows another example of using non-volatile storage for on-chip primary storage. In this example, the non-volatile storage is used to store context information for a number of hardware threads. The processing element 4 in this example has register storage 6 for storing architectural state (context information) for a certain number of active threads. While not shown in FIG. 9 for conciseness, the processing element 4 could also have caches 8, 10 as shown in FIG. 1. The register storage 6 could be implemented using either volatile storage (e.g. SRAM), or non-volatile storage. If the core is a single-threaded core, the registers 6 may have capacity for storing state for only a single thread at a thread. Alternatively, the processing element 4 could be a multi-threaded core which has register storage 6 sufficient to store multiple sets of architectural state for two or more active threads. If the multi-threaded core 4 uses non-volatile storage for the register storage 6, this could be implemented similar to the example of FIG. 6 for example.

In the example of FIG. 9, the apparatus includes, as part of the RAM 22, a region of on-chip non-volatile primary storage, which includes a number of hardware thread regions 149 for storing context information for a certain number of hardware threads. The number of hardware thread regions 149 may be greater than the number of active threads for which register storage 6 is provided in the processing element 4.

A hardware thread scheduler 148 is provided to manage which of the hardware threads is selected as the active thread(s) to be processed by the processing element 4. Any known hardware thread management scheme may be used to select which hardware thread is active. When a context switch is made from processing a first hardware thread as an active thread to processing a second hardware thread as an active thread instead of the first hardware thread, the architectural state of the first hardware thread is copied from the registers 6 to the hardware thread storage region 149 associated with the first hardware thread, and architectural state of the second hardware thread is copied to the registers 6 from the hardware thread storage region 149 associated with the second hardware thread. For a given hardware thread storage region, in cycles when no state saving or restoration is required for the related hardware thread, the corresponding hardware thread storage region 149 may be placed in a powered down state by power control circuitry 147.

In summary, non-volatile storage can be used to store hardware thread context state. This allows a hardware thread scheduler 148, for example, to orchestrate hardware threads with no interruption between compute cycles, in between which the machine can be powered off without losing the contents. The low latency and large capacity of on-chip NVRAM storage allow a large number of resident contexts and fast context switches by accessing the context in on-chip memory while it is being copied to the register file. This way, the context state of more threads than those that can run concurrently can be stored on chip, and threads can quickly be swapped in and out for execution on the processing circuitry 4.

Figure 10:
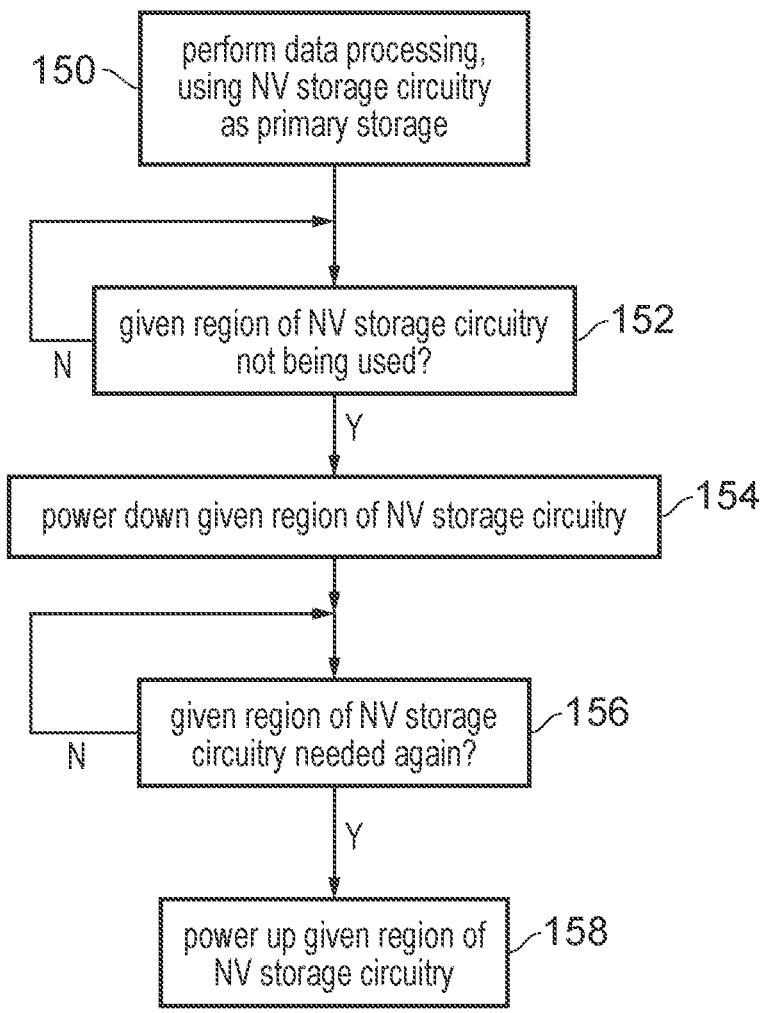
FIG. 10 is a flow diagram showing a method of controlling powering up and down a region of non-volatile storage circuitry used as primary storage by the processing circuitry.

FIG. 10 is a flow diagram showing a method of controlling powering up or down non-volatile storage circuitry used as primary storage. At step 150, data processing is performed on a processing element 4, 12 using the non-volatile storage circuitry as primary storage (e.g. registers, cache, TLB, RAM or scratchpad memory).

At step 152 the power control circuitry 44, 54, 64 determines whether a given region of the non-volatile storage circuitry is not being used in a current cycle. The information may be considered unused if it is not needed to be read/written in the current cycle, even if the related thread is still in progress. Also, the information could be considered unused if it relates to a stalled thread, or a subset of register state not needed for a given section of code, or if the corresponding thread is not currently issuing instructions in the current cycle. When a given region is identified as not being used, then at step 154 that region of the non-volatile storage circuitry is powered down. No state saving operation is needed at step 154 because the contents of the powered down region will be retained even when no power is supplied.

At step 156, the power control circuitry 44, 54, 64 checks for events which indicate that information in the given region of non-volatile storage is needed again, e.g. for a read or write operation issued by the corresponding thread, or because the stall has been resolved, or because an external request has been received for information in the powered down region of storage. If the given region of non-volatile storage is needed again, then at step 158 the region is powered up again (without needing to restore state to the given region).

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An apparatus comprising:
processing circuitry to perform data processing in response to instructions;
non-volatile storage circuitry accessible by the processing circuitry as primary storage; and
power control circuitry to power down a given region of the non-volatile storage circuitry when information stored in said given region is not being used, in which:
the non-volatile storage circuitry comprises a plurality of hardware thread storage regions each to store context information associated with a corresponding one of a plurality of hardware threads; and the processing circuitry is configured to process instructions from at least one active thread selected from among said plurality of hardware threads; or
in response to a stall event occurring during processing of instructions from a given thread, the power control circuitry is configured to power down at least part of a region of the non-volatile storage circuitry which stores information associated with the given thread; or the processing circuitry is configured to process instructions in one of a plurality of operating states; and when the processing circuitry is processing instructions in a current operating state, the power control circuitry is configured to power down a region of the non-volatile storage circuitry for storing information associated with at least one operating state other than the current operating state; or the non-volatile storage circuitry comprises registers to store architectural state of the processing circuitry; and in response to a thread or a portion of a thread which does not require a subset of the architectural state, the power control circuitry is configured to power down a region of the non-volatile storage for storing the subset of the architectural state.

2. The apparatus according to claim 1, in which the processing circuitry is configured to directly obtain operands for execution of said instructions from said non-volatile storage circuitry and to directly store results of said instructions to said non-volatile storage circuitry.

3. The apparatus according to claim 1, in which when powering down the given region of the non-volatile storage circuitry, the power control circuitry is configured to omit saving of information stored in the given region to a powered up storage region or to secondary storage.

4. The apparatus according to claim 1, in which the processing circuitry is configured to use the non-volatile storage circuitry as at least one of:
registers to store architectural state of the processing circuitry;
a cache;
a scratchpad memory; and
random access memory serving as primary storage;
a prediction structure to store prediction state used to control speculative execution of instructions by the processing circuitry.

5. The apparatus according to claim 1, in which the power control circuitry is configured to control, on a cycle by cycle basis, whether the given region of the non-volatile storage circuitry is in a power up state or a power down state.

6. The apparatus according to claim 1, in which the processing circuitry is configured to process instructions from a plurality of threads; and
the non-volatile storage circuitry comprises a plurality of thread-specific storage regions each to store information associated with a corresponding thread of the plurality of threads.

7. The apparatus according to claim 6, in which:
when processing a plurality of active threads including a given thread, the thread-specific storage region associated with the given thread is accessible to the given thread and inaccessible to active threads other than the given thread; and
when processing a supervisory process for supervising the given thread, the thread-specific storage region associated with the given thread is accessible.

8. The apparatus according to claim 6, comprising a shared storage region of the primary storage accessible to more than one of the plurality of threads.

9. The apparatus according to claim 6, in which the power control circuitry is configured to control the given thread-specific storage region associated with a given thread to be in a power down state in a cycle when none of a plurality of power up conditions is satisfied;
said plurality of power up conditions including at least:
the given thread or a supervisory process requiring access to the given thread-specific storage region; and
information to be written to the given thread-specific storage region being returned in response to a memory access initiated in an earlier cycle.

10. The apparatus according to claim 6, in which the non-volatile storage circuitry comprises a cache comprising said plurality of thread-specific storage regions; and
on powering down a given thread-specific storage region of the cache, when the given thread-specific storage region includes dirty information, the power control circuitry is configured to omit writing back the dirty information to memory.

11. The apparatus according to claim 6, in which the non-volatile storage circuitry comprises a cache comprising said plurality of thread-specific storage regions; and
in response to a memory access request issued by another processing element other than the processing circuitry, when the request specifies an address corresponding to information in a given thread-specific storage region of the cache which is powered down, the power control circuitry is configured to power up the thread-specific storage region to allow the request to be serviced.

12. The apparatus according to claim 1, in which in response to the stall event occurring during processing of instructions from the given thread, the power control circuitry is configured to power down the at least part of the region of the non-volatile storage circuitry which stores the information associated with the given thread, and the stall event comprises at least one of:
a memory access requiring latency longer than a given threshold;
a miss in a given level of cache;
a memory access which requires access to data stored in secondary storage;
an event indicative of the given thread waiting for a synchronisation variable to indicate that the given thread is allowed to access a shared variable for which exclusive access to the shared variable is controlled based on the synchronisation variable;
an event indicative of the given thread waiting for a message to be received from another thread or external device; and
execution of a wait-for-event instruction by the given thread.

13. The apparatus according to claim 1, in which the non-volatile storage circuitry comprises the registers to store the architectural state of the processing circuitry; and when, in response to the thread or the portion of the thread which does not require the subset of the architectural state, the power control circuitry is configured to power down the region of the non-volatile storage for storing the subset of the architectural state, and the subset of the architectural state comprises at least one of:
floating-point register state comprising floating-point values or floating-point control state for controlling processing of the floating-point values; and
vector register state comprising vector values or vector control state for controlling processing of the vector values;
control register state to initialize and control system functions;
status register state comprising indications of historical events; and
control register state comprising control information of an operating state other than the current operating state.

14. The apparatus according to claim 13, in which the power control circuitry is configured to determine whether said thread or said portion of the thread requires said subset of architectural state based on at least one of:
hint information specified by program code for said thread or said portion of the thread; and
monitoring information collected by monitoring circuitry on a previous instance of executing said thread or said portion of the thread.

15. A data processing method comprising:
performing data processing in response to instructions, using processing circuitry;
accessing non-volatile storage circuitry as primary storage of the processing circuitry; and
powering down a given region of the non-volatile storage circuitry when information stored in said given region is not being used; in which:
the non-volatile storage circuitry comprises a plurality of hardware thread storage regions each to store context information associated with a corresponding one of a plurality of hardware threads; and the processing circuitry processes instructions from at least one active thread selected from among said plurality of hardware threads; or
in response to a stall event occurring during processing of instructions from a given thread, the method comprises powering down at least part of a region of the non-volatile storage circuitry which stores information associated with the given thread; or
the processing circuitry is configured to process instructions in one of a plurality of operating states; and when the processing circuitry is processing instructions in a current operating state, the method comprises powering down a region of the non-volatile storage circuitry for storing information associated with at least one operating state other than the current operating state; or
the non-volatile storage circuitry comprises registers to store architectural state of the processing circuitry; and the method comprises, in response to a thread or a portion of a thread which does not require a subset of the architectural state, powering down a region of the non-volatile storage for storing the subset of the architectural state.

16. An apparatus comprising:
processing circuitry to perform data processing in response to instructions;
non-volatile storage circuitry accessible by the processing circuitry as primary storage; and
power control circuitry to power down a given region of the non-volatile storage circuitry when information stored in said given region is not being used, in which the processing circuitry is configured to process instructions from a plurality of threads; and
the non-volatile storage circuitry comprises a plurality of thread-specific storage regions each to store information associated with a corresponding thread of the plurality of threads, in which:
when processing a plurality of active threads including a given thread, the thread-specific storage region associated with the given thread is accessible to the given thread and inaccessible to active threads other than the given thread; and when processing a supervisory process for supervising the given thread, the thread-specific storage region associated with the given thread is accessible; or the non-volatile storage circuitry comprises a cache comprising said plurality of thread-specific storage regions; and on powering down a given thread-specific storage region of the cache, when the given thread-specific storage region includes dirty information, the power control circuitry is configured to omit writing back the dirty information to memory; or the non-volatile storage circuitry comprises a cache comprising said plurality of thread-specific storage regions; and in response to a memory access request issued by another processing element other than the processing circuitry, when the request specifies an address corresponding to information in a given thread-specific storage region of the cache which is powered down, the power control circuitry is configured to power up the thread-specific storage region to allow the request to be serviced; or the power control circuitry is configured to control the given thread-specific storage region associated with a given thread to be in a power down state in a cycle when none of a plurality of power up conditions is satisfied; said plurality of power up conditions including at least:

the given thread or a supervisory process requiring access to the given thread-specific storage region; and information to be written to the given thread-specific storage region being returned in response to a memory access initiated in an earlier cycle.

17. The apparatus according to claim 16, comprising a shared storage region of the primary storage accessible to more than one of the plurality of threads.

* * * * *